Patented Nov. 15, 1927.

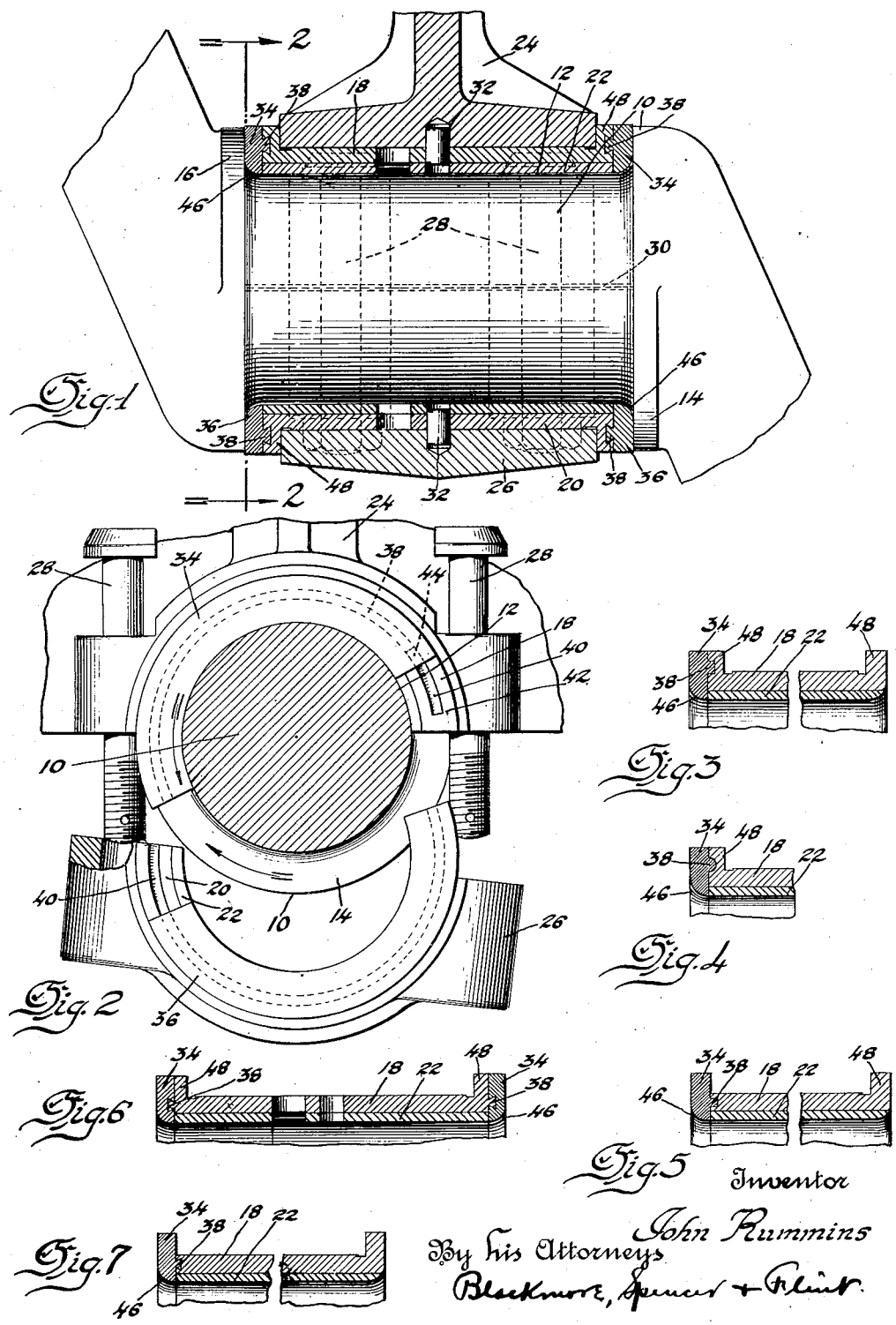

1,649,258

UNITED STATES PATENT OFFICE.

JOHN RUMMINS, OF LANSING, MICHIGAN, ASSIGNOR TO GENERAL MOTORS CORPORATION, OF DETROIT, MICHIGAN, A CORPORATION OF DELAWARE.

SHAFT BEARING.

Application filed December 29, 1922. Serial No. 609,657.

This invention relates to bearings, and is illustrated as embodied in a bearing for the crankshaft of an automobile engine.

Due to the operation of the clutch, and for other reasons, shafts such as automobile crankshafts develop a substantial end thrust which frequently wears the bearings sufficiently to allow the shaft an undesirable amount of longitudinal play while the bearings are otherwise quite serviceable. An object of the present invention is to provide means, such as a novel form of end shim, for taking up the bearings to eliminate such play.

With this object in view, the invention contemplates the use, in combination with a bearing, of an end shim arranged to be readily removed and replaced when worn. In order that the shim may be replaced without disturbing the shaft, I prefer that it be removable from the bearing by a circumferential motion; and as a convenient way of providing for this, it may be secured to the bearing by a circumferential tongue-and-groove joint.

The above and other objects and features of the invention, including an arrangement for cheapening the manufacture of the bearing by using the shim as an end flange therefor, and other improved constructions and novel combinations, will be apparent from the following description of several illustrative embodiments of the invention shown in the accompanying drawings, in which:

Fig. 1 is a view showing part of a crankshaft in side elevation and one of the bearings in longitudinal section;

Fig. 2 is a view on the line 2—2 of Fig. 1, but with the bearing taken apart to illustrate the manner of replacing a worn shim; and Figs. 3, 4, 5, 6, and 7 are partial longitudinal sections showing various modifications.

As shown in these drawings, a crankshaft 10 is formed with a cylindrical portion 12, to be supported by a bearing, and with flanges 14 and 16 to limit longitudinal movement of the shaft to prevent end play.

The shaft is supported by a bearing member comprising a pair of hollow semi-cylindrical parts 18 and 20, faced with Babbitt metal at 22, and supported in a hanger consisting of parts 24 and 26 fastened together by bolts 28 or in any other suitable manner, with or without the usual side shims indicated by dotted lines at 30 in Fig. 1. Parts 18 and 20 are ordinarily made of brass. Pins 32 may be provided to prevent the bearing member from turning in the hanger.

As explained above, end shims, each shown as made in two parts 34 and 36, are provided to receive wear due to the end thrust of the shaft. In the form shown in Figs. 1 and 2 the shims are provided with a circumferential projection 38 of dovetail cross section, seating in a corresponding groove 40 in one end of the bearing member. A stop may be provided to prevent the shims from turning with the shaft by terminating groove 40 to form a stop shoulder 42, and similarly cutting off projection 38 at 44.

In order to prevent the shims from sticking, I prefer that they should extend across the ends of the Babbitt metal facing 22, and be substantially flush with the inner face thereof, and I also prefer that the shims be chamfered at 46 as shown, to fit closely against corresponding fillets on the shaft.

In replacing a worn shim, as shown in Fig. 2, bolts 28 are released, and the lower part of the bearing, including members 26, 20, and 36, is removed and part 36 of the shim is replaced by a new part. Part 34 of the shim is removed by sliding it in a counter-clockwise direction around circumferentially of the shaft, and a new part put in by sliding it in a clockwise direction, whereupon the lower part of the bearing is replaced. It is especially to be noted that my improved end shim can be removed and replaced without disturbing the shaft.

As shown in Figs. 1 and 6, shims may be used at both ends of the bearing, or as shown in Figs. 3 and 5, at one end only. As shown in Figs. 1, 3, 4, and 6, the bearing member may be formed with flanges 48, or the flanges may be formed by the shims as shown in Figs. 5 and 7. The latter forms are of advantage in lessening the cost of manufacture.

The tongue 38 and groove 40 may be dovetailed in cross-section (Figs. 1, 6, and 7), or rectangular (Figs. 3 and 5), or semicircular (Fig. 4). The dovetailed form is advantageous in shipment, in holding the shims and bearing members together, but the rectangular and semicircular forms are more readily manufactured and hold equally well when in place about a shaft. As shown in Fig. 6, the groove may be formed in the shim and the tongue on the bearing member, instead of vice versa. All the forms can be removed by a circumferential movement without disturbing the shaft. The shims may be made of brass, or other suitable material.

Stop 42 may be omitted and side shims 30 carried across the joints between the parts of the end shims to prevent them from turning.

While several useful embodiments of the invention have been illustrated and described, it is not my intention to limit its scope thereby, or otherwise than by the terms of the appended claims.

I claim:

1. A bearing comprising, in combination, a two-piece bearing member constructed and arranged to surround a shaft, and a corresponding two-piece end shim secured thereto by a tongue-and-groove joint, to receive end thrust from the shaft and to be removable by a circumferential movement, the groove terminating in a shoulder and the tongue stopping short in position to engage the shoulder to prevent circumferential movement of the shim when in place.

2. In combination, a shaft, separable upper and lower bearing supporting members, bearings secured therein for receiving said shaft and taking the wear due to rotation of the shaft, and removable thrust receiving members keyed to said bearing members to permit their rotation thereon for effecting their separation from said bearing members when said lower section is removed.

3. In combination, a shaft, separable upper and lower bearing supporting members, bearings secured therein for receiving said shaft and taking the wear due to rotation of the shaft, removable thrust receiving members keyed to said bearing members to permit their rotation thereon for effecting their separation from said bearing members, and stop means for limiting said rotation in one direction.

In testimony whereof I affix my signature.

JOHN RUMMINS.